United States Patent
Yoshida et al.

(10) Patent No.: US 7,018,038 B2
(45) Date of Patent: Mar. 28, 2006

(54) SPECTACLE INSTALLATION DEVICE AND SPECTACLE FRAME

(75) Inventors: Takehiko Yoshida, Osaka (JP); Mitsuhisa Uekaji, Osaka (JP)

(73) Assignee: Vision Optic Co., Ltd., Osaka (JP)

( * ) Notice: Subject to any disclaimer, the term of this patent is extended or adjusted under 35 U.S.C. 154(b) by 0 days.

(21) Appl. No.: 10/513,929

(22) PCT Filed: Mar. 24, 2004

(86) PCT No.: PCT/JP2004/004033

§ 371 (c)(1),
(2), (4) Date: Nov. 10, 2004

(87) PCT Pub. No.: WO2004/113995

PCT Pub. Date: Dec. 29, 2004

(65) Prior Publication Data

US 2005/0168680 A1 Aug. 4, 2005

(30) Foreign Application Priority Data

Jun. 19, 2003 (JP) ............................. 2003-174571
Oct. 16, 2003 (JP) ............................. 2003-356187

(51) Int. Cl.
*G02C 5/14* (2006.01)
(52) U.S. Cl. .................... 351/123; 351/111; 351/121
(58) Field of Classification Search ................ 351/123, 351/111, 121, 122, 41, 158
See application file for complete search history.

(56) References Cited

U.S. PATENT DOCUMENTS 4,389,102 A * 6/1983 Piampiano .................. 351/123
4,684,226 A * 8/1987 Anger ........................ 351/123
4,712,893 A * 12/1987 Anger ........................ 351/123
4,863,257 A * 9/1989 Morgan ...................... 351/123

(Continued)

FOREIGN PATENT DOCUMENTS

JP 62-14618 1/1987

(Continued)

OTHER PUBLICATIONS

English Translation of PCT International Search Report mailed Jun. 8, 2004, for PCT/JP2004/004033 (Filed Mar. 24, 2004).

(Continued)

*Primary Examiner*—Hung Xuan Dang
(74) *Attorney, Agent, or Firm*—Sterne, Kessler, Goldstein & Fox P.L.L.C.

(57) ABSTRACT

In an optical frame attachment according to the present invention, a flexible tangle preventing member 4 is attached so as to couple a predetermined portion 2b anterior to a part 2a of a temple, where an ear contacting portion 3a is attached, and a front end 3c of the ear contacting portion 3a; and is attached so as to couple the temple 2 and the front end 3c of the ear contacting portion 3a even when the temple 2 is lifted upward upon taking off glasses. Since a space between the temple 2 and the front end 3c of the ear contacting portion 3a is blocked by the tangle preventing member 4, even when the temple 2 is lifted upward upon taking off the glasses, the hair is less likely to enter an oscillating portion 3b serving as an attaching portion of the temple 2 and an ear pad member 3, and tangling thereto is suppressed. Further, since the tangle preventing member 4 has flexibility, the function of suppressing the slipping down of the glasses are not inhibited.

5 Claims, 6 Drawing Sheets

U.S. PATENT DOCUMENTS 5,440,356 A * 8/1995 Fukuwa ..................... 351/123
5,631,718 A * 5/1997 Markovitz et al. .......... 351/119
5,790,229 A * 8/1998 Poloni et al. ................ 351/123

FOREIGN PATENT DOCUMENTS

| JP | 1-164423 U | 11/1989 |
| JP | 2-119618 U | 9/1990 |
| JP | 7-56124 | 3/1995 |

OTHER PUBLICATIONS

English abstract of JP 62-14618 (Jan. 1987).
English abstract of JP 1-164423 U (Nov. 1989).
English abstract of JP 2-119618 U (Sep. 1990).
English abstract of JP 7-56124 (Mar. 1995).
PCT International Search Report mailed Jun. 8, 2004 for PCT/JP2004/004033 (filed Mar. 24, 2004).

* cited by examiner

SPECTACLE INSTALLATION DEVICE AND SPECTACLE FRAME

TECHNICAL FIELD

The present invention relates to an optical frame attachment attachable to an optical frame, and to an optical frame. More particularly, the present invention relates to an optical frame attachment and an optical frame for preventing glasses from slipping down.

BACKGROUND ART

A present commonly used optical frame comprises a front frame which holds lenses and to which nose pads are attached, and a pair of temples each of which extends backward from both ends of the front frame. A rear portion of the temple is bent downward; thus, functioning as an ear pad member. Glasses are worn by hooking the rear portion of the temple at the back of an ear (between ear and head). However, since a part (rear portion) of the temple constitutes the ear pad member, when a user performs various movements, the rear portion of the temple easily slips up, so that the glasses are easily slipped down.

Figure 6:
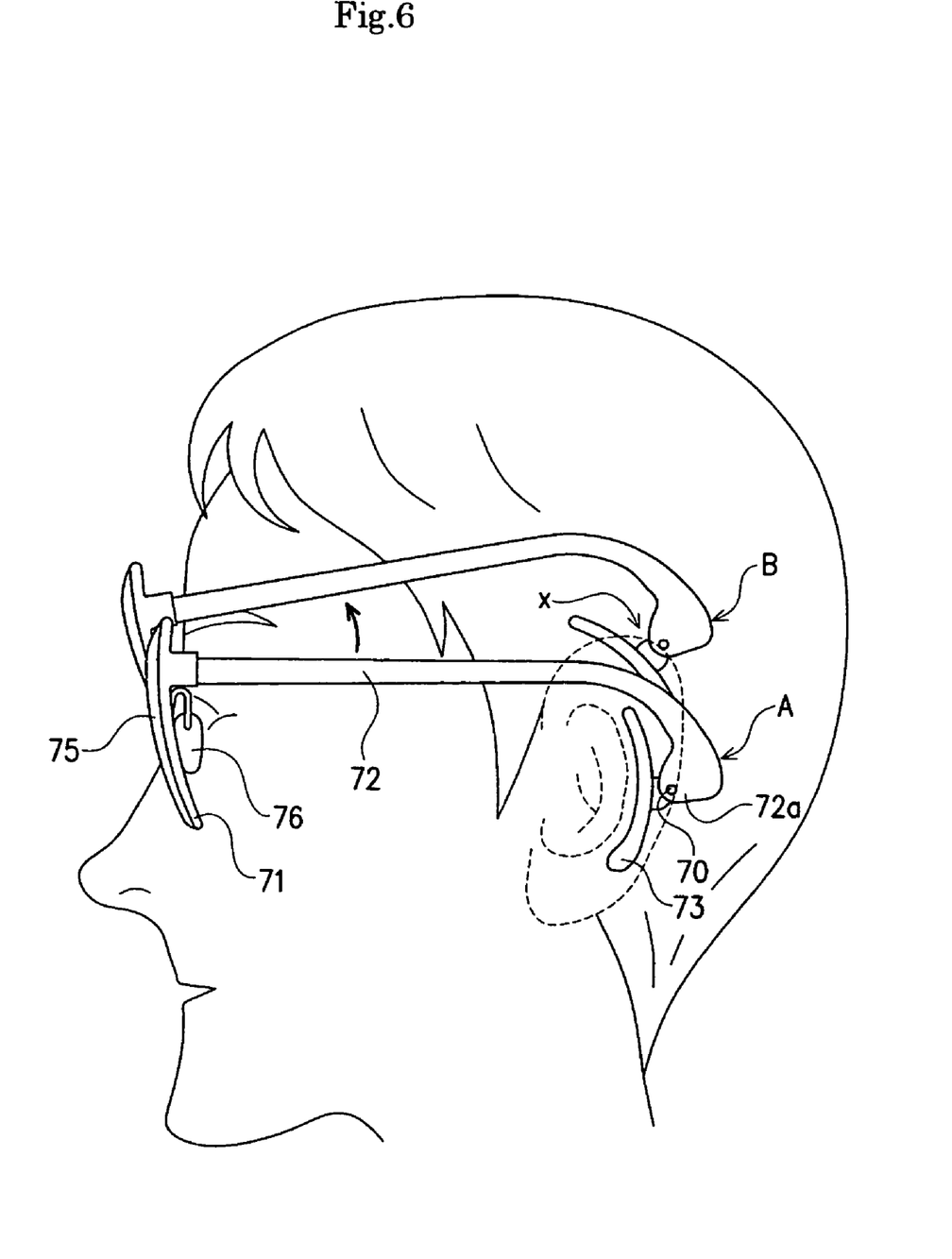
FIG. 6 is a schematic side view of a conventional optical frame.

As an optical frame that overcomes the above problems and that prevents glasses from slipping down, there has been well-known an optical frame, as disclosed in JP-A 07-56124 (1995), having an ear pad member separately from a temple, wherein the ear pad member is formed so as to freely oscillate with respect to the temple. FIG. 6 is a schematic side view of a conventional optical frame. As shown in FIG. 6, according to the conventional optical frame disclosed in, for example, JP-A 07-56124 (1995), when a front frame 71 starts to slip down in a state where the glasses are worn (state A), a rear portion of a temple 72 starts to slip up, thereby moving a ear pad member 73 upward. When the ear pad member 73 starts to move upward, the ear pad member 73 starts to rotate in a counter-clockwise direction with the use of a shaft 70 of an ear pad member attaching portion 72a of the temple 72 as a rotational center. Herein, a force in a front end of the ear pad member 73 pressing against the back of the ear becomes greater and, as a result, the relative movement between the ear pad member 73 and the back of the ear is hindered, so that the rear portion of the temple 13 is prevented from slipping up. Glasses are thereby prevented from slipping down.

However, the conventional optical frame has the following problems. First, the optical frame attached with the ear pad member 73 as in the conventional optical frame is a special optical frame and does not have versatility. Particularly, since the optical frame has presently established a status as an accessory or as part of fashion, the optical frame is often changed depending on the mood of the day. To have all the optical frames like the conventional optical frame increases their manufacturing cost, thus increasing the unit price of the optical frame. Further, it is considered that the degree of freedom of design of the optical frame is limited. On the other hand, if the user has a plurality of optical frames, it is expensive to have all the optical frames like the above optical frame, thus narrowing the range of choice of the optical frame.

Secondly, if the temple 72 is lifted upward when the user takes off the glasses (state B), the hair tends to get into a space between the temple 72 and the front end of the ear pad member 73 from an x direction and gets tangled at an attaching portion 72a of the temple 72 and the ear pad member 73, thus pulling the hair. Therefore, the user feels uncomfortable every time the user takes off the glasses. As described above, the ear pad member 73 starts to rotate in the counter-clockwise direction in FIG. 6 when the temple 72 is lifted upward and the angle between the temple 72 and the front end of the ear pad member 73 is increased, thus causing the hair to easily get in. Particularly, such a problem is significant to a user with long hair, and the user may lose the desire to wear the glasses.

The present invention is made in order to overcome the above problems, and it is a first object of the present invention to provide an optical frame attachment and an optical frame capable of preventing glasses from slipping down without using a special frame and without increasing the load on a nose by an optical frame.

It is a second object of the present invention to provide an optical frame attachment and an optical frame capable of preventing glasses from slipping down without increasing the load on a nose and, also, capable of suppressing tangling of hair to the glasses upon taking off the glasses.

DISCLOSURE OF THE INVENTION

In order to achieve the first object of the present invention, an optical frame attachment according to the present invention is removably attached to an optical frame including a front frame for holding lenses and a pair of temples each extending backward from both ends of the front frame, and comprises a clip portion removably attached to a rear portion of the temple, an ear contacting portion attached to the clip portion in a freely oscillating manner by way of a shaft member and contactable to a back of an ear, and (an oscillating portion including an ear contacting portion contactable to the back of the ear and a shaft member such as a pin or a screw and attaching the clip portion and the ear contacting portion in a freely oscillating manner using the shaft member).

The optical frame attachment of the present invention can be removably attached to the rear end of the temple of a typical optical frame by the clip portion. Further, the clip portion and the ear contacting portion are attached in a freely oscillating manner using the shaft member such as a pin or a screw. The temple of the optical frame and the ear contacting portion of the optical frame attachment are thereby attached in a freely oscillating manner.

In a state where glasses are worn, when the front frame of the optical frame starts to slip down, the rear portion of the temple extending from the front frame starts to move upward, thereby moving the ear contacting portion of the optical frame attachment attached to the temple in a freely oscillating manner upward. When the ear contacting portion starts to move upward, the ear contacting portion rotates in the front rotation direction with the use of the shaft member as a rotational center. Herein, the force of the front end of the ear contacting portion pressing against the back of the ear becomes greater. As a result, the relative movement of the ear contacting portion and the back of the ear is hindered, and the rear portion of the temple is prevented from moving upward. The glasses can be thereby prevented from slipping down.

Thus, by providing the clip portion removably attached to the temple of the typical optical frame and by providing the ear contacting portion attached to the temple in a freely oscillating manner with the clip portion attached to the temple, the glasses can be prevented from slipping down without using a special optical frame and without increasing the load on the nose by the optical frame. Further, even when a user has a plurality of optical frames, by removably attaching the optical frame attachment to the optical frame of various designs, an effective effect of preventing the glasses from slipping down in any kind of optical frame can be achieved with only one (a pair of) optical frame attachment.

In order to achieve the above second object, the optical frame attachment further comprises a flexible tangle preventing member having a first end coupled to a front end of the ear contacting portion and a second end removably attached to a predetermined portion anterior to a part of the temple, where the clip portion is attached.

In this case, the flexible tangle preventing member is attached so as to couple the predetermined portion anterior to the part, where the clip portion is attached, of the temple of the optical frame and the front end of the ear contacting portion of the optical frame attachment. Even when the temple is lifted upward upon taking off the glasses, since the space between the temple and the front end of the ear contacting portion is blocked by the tangle preventing member, the hair is less likely to enter the attaching portion of the temple and the ear contacting portion and the tangling thereto is suppressed. The tangle preventing member has flexibility and does not inhibit oscillation of the ear contacting portion of the optical frame attachment, and thus does not inhibit the function of suppressing the slipping down of the glasses.

In this way, by coupling the predetermined portion anterior to the part, where the clip portion is attached, of the temple of the optical frame and the front end of the ear contacting portion of the optical frame attachment with the flexible tangle preventing member, the slipping down of the glasses can be prevented without increasing the load on the nose, and the tangling of the hair to the glasses can be suppressed upon taking off the glasses.

Preferably, the tangle preventing member is an elastic member, and is configured to switch between a posture for acting an elastic force to press the front end of the ear contacting portion toward the temple side and a posture for acting an elastic force to move the front end of the ear contacting portion away from the temple.

In this case, the tangle preventing member is made of an elastic member and can be switched between a posture in which the front end of the ear contacting portion is pressed toward the temple side and a posture in which the front end of the ear contacting portion is held at a position apart from the temple. Therefore, when the front end of the ear contacting portion is held at the position apart from the temple, there is obtained a state where a distance between the lens (front frame) and the rear end of the tangle preventing member is wide. Thus, the user can easily wear the glasses without the ear pad member being in the way (without holding the ear pad member with hand) upon putting on the glasses. Further, by contacting to the ear, the posture of the tangle preventing member is switched to the posture for acting the elastic force to press the front end of the ear contacting portion toward the temple side, and the rear end of the ear contacting portion can securely contact the back of the ear.

Since the tangle preventing member can switch the postures of the ear contacting portion with the elastic force thereof, the glasses can be easily worn and, also, the slipping down of the glasses can be effectively suppressed.

An optical frame according to the present invention is attached with the optical frame attachment having the above configuration.

The optical frame according to the present invention comprises a front frame for holding lenses, a pair of temples each extending backward from both ends of the front frame, an ear pad member having an ear contacting portion attached with the rear portion of the temple in a freely oscillating manner by way of a shaft member and contactable to a back of an ear, and a flexible tangle preventing member for coupling a predetermined portion anterior to a part of the temple, where the ear pad member is attached, and a front end of the ear contacting portion. Herein, the tangle preventing member is an elastic member, and is configured to switch between a posture for acting an elastic force to press the front end of the ear contacting portion toward the temple side and a posture for acting an elastic force to move the front end of the ear contacting portion away from the temple.

With regards to the optical frame according to the present invention, in a state where glasses are worn, when the front frame starts to slip down, the rear portion of the temple extended from the front frame starts to move upward, thereby moving the ear contacting portion of the ear pad member attached to the rear portion of the temple upward. When the ear contacting portion of the ear pad member starts to move upward, the ear contacting portion of the ear pad member rotates in a front rotation direction with the use of the shaft member as a rotational center. Herein, the force of the front end of the ear contacting portion pressing against the back of the ear becomes greater. As a result, the relative movement of the ear contacting portion and the back of the ear is hindered and the rear end of the temple is inhibited from moving upward. The glasses can be thereby prevented from slipping down.

On the other hand, the flexible tangle preventing member is attached so as to couple a predetermined portion anterior to a part of the temple, where the ear pad member is attached, and the front end of the ear contacting portion. Even when the temple is lifted upward upon taking off the glasses, the space between the temple and the front end of the ear contacting portion is blocked with the tangle preventing member. Thus, the hair is less likely to enter an attaching part between the temple and the ear pad member and tangling thereto is suppressed. The tangle preventing member has flexibility and does not hinder oscillation of the ear pad member, and thus does not hinder the function of suppressing the slipping down of the glasses.

In this way, by coupling the predetermined portion anterior to the part, where the ear pad member is attached, of the temple and the front end of the ear contacting portion of the ear pad member with the flexible tangle preventing member, the slipping down of the glasses can be prevented without increasing the load on the nose, and the tangling of the hair to the glasses can be suppressed upon taking off the glasses.

Further, the tangle preventing member is made of an elastic member, and can be switched between a posture in which the front end of the ear contacting portion is pressed against the temple side and a posture in which the front end of the ear contacting portion is held at a position apart from the temple. Therefore, when the front end of the ear contacting portion is held at the position apart from the temple, there is obtained a state where a distance between the lens (front frame) and the rear end of the tangle preventing member is wide. Thus, the user can easily wear the glasses without the ear pad member being in the way (without holding the ear pad member with hand) upon putting on the glasses. Further, by contacting to the ear, the posture of the tangle preventing member is switched to the posture for acting the elastic force to press the front end of the ear contacting portion toward the temple side, and the rear end of the ear contacting portion can securely contact the back of the ear.

Since the tangle preventing member can switch the postures of the ear contacting portion with the elastic force thereof, the glasses can be easily worn and, also, the slipping down of the glasses can be effectively suppressed.

BEST MODE FOR CARRYING OUT THE INVENTION

Figure 1:
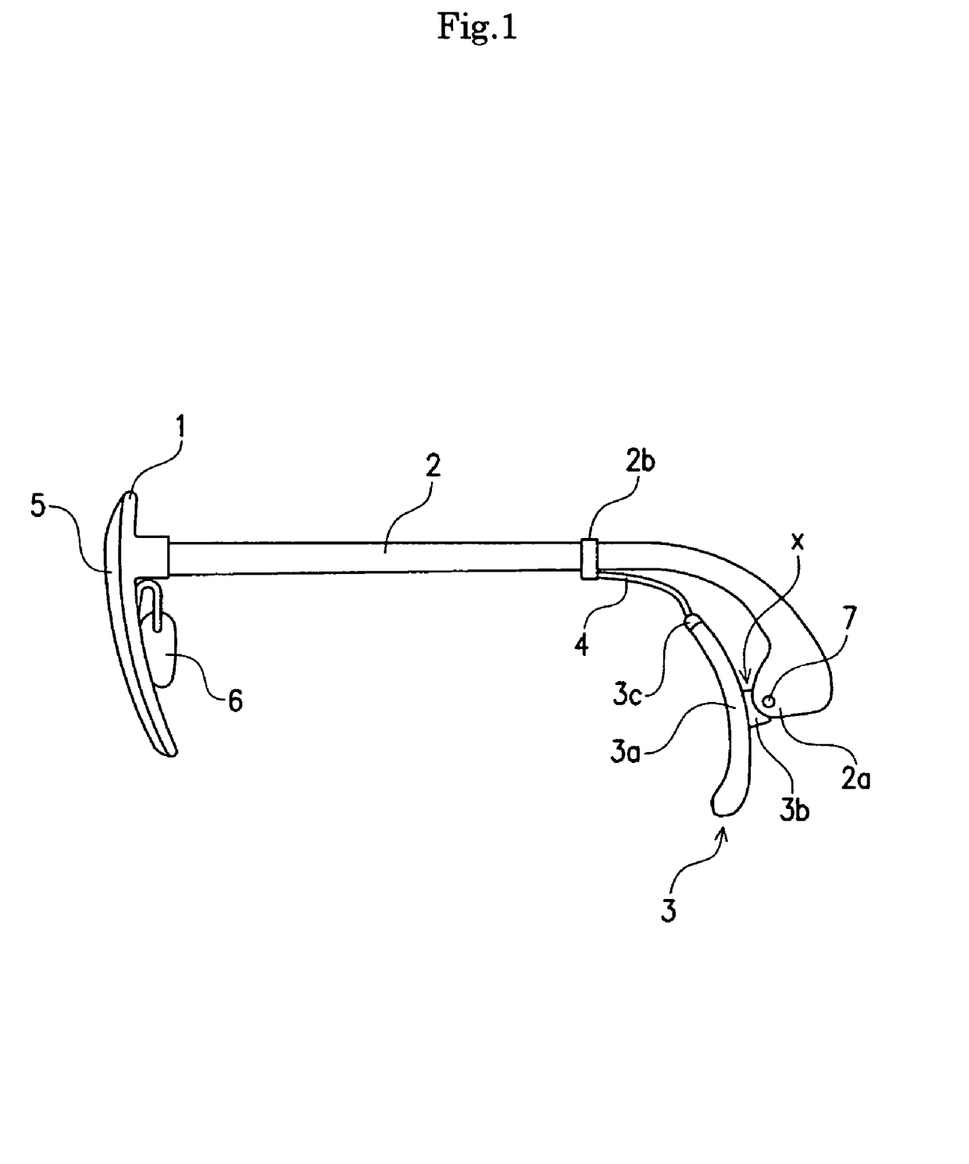
FIG. 1 is a side view of an optical frame according to a first embodiment of the present invention.
Figure 2:
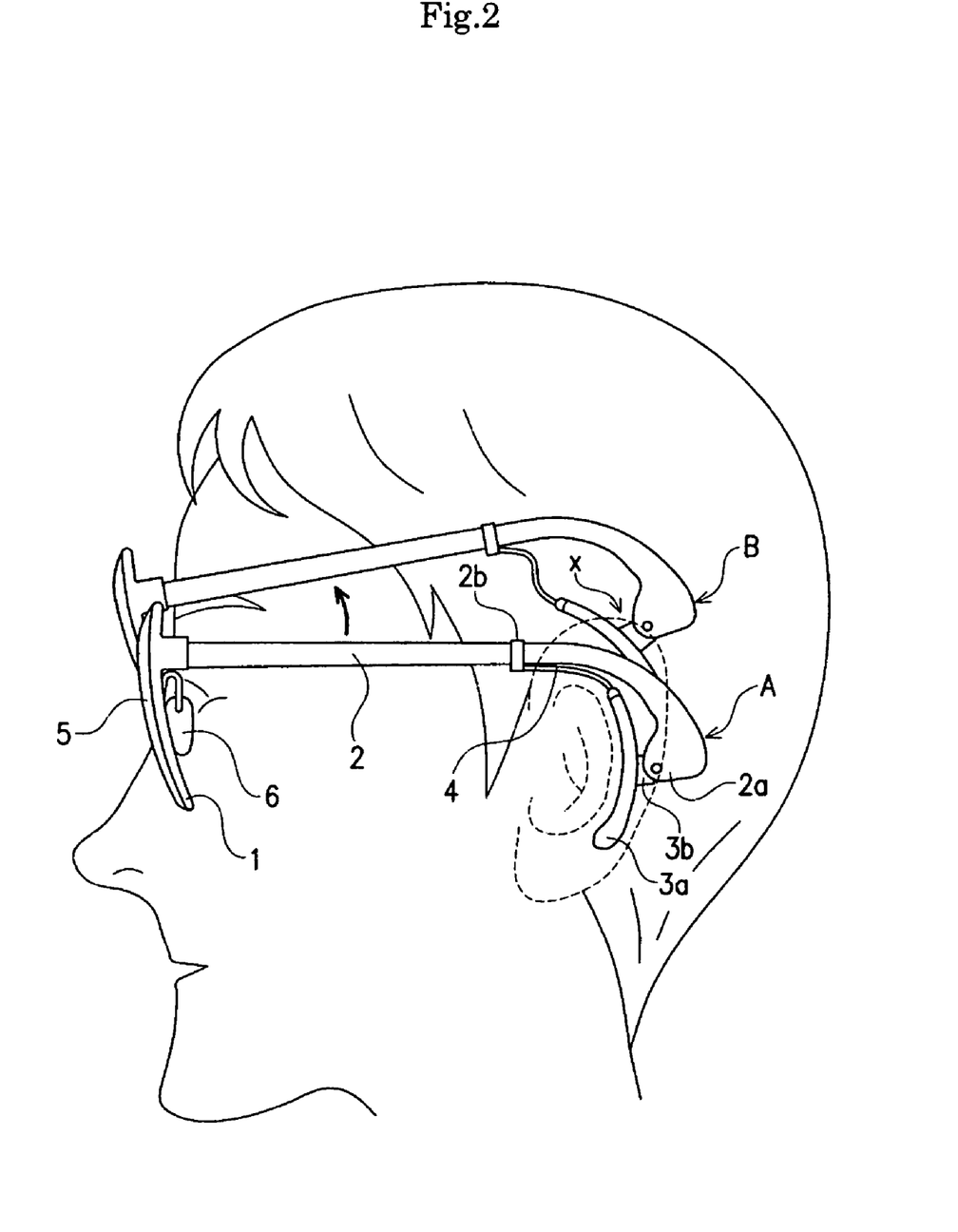
FIG. 2 is a schematic view showing a case where the optical frame of FIG. 1 is worn.

Preferred embodiments of the present invention will now be described with reference to the accompanying drawings. First, a first embodiment will be described. FIG. 1 is a side view of an optical frame according to the first embodiment of the present invention, and FIG. 2 is a schematic view showing a case where the optical frame of FIG. 1 is worn.

As shown in FIG. 1, the optical frame according to the present invention comprises a front frame 1 which holds lenses 5, a pair of temples 2 each of which extends backward from both ends of the front frame 1, an ear pad member 3 which has an ear contacting portion 3a contactable to a back of an ear and an oscillating portion 3b with a shaft member 7, such as a pin or a screw, for attaching a rear portion of the temple 2 and the ear contacting portion 3a in a freely oscillating manner, and a flexible tangle preventing member 4 which couples a predetermined portion 2b positioned anterior to a part 2a of the temple 2, where the ear pad member 3 is attached, and a front end 3c of the ear contacting portion 3a. A pad 6 for a nose pad is attached to the front frame 1 and, as shown in FIG. 2, glasses are worn by placing the pad 6 on the nose and, also, hooking the ear contacting portion 3a of the curved ear pad member 3 on a curved portion at the back of the ear (between ear and head).

Figure 3:
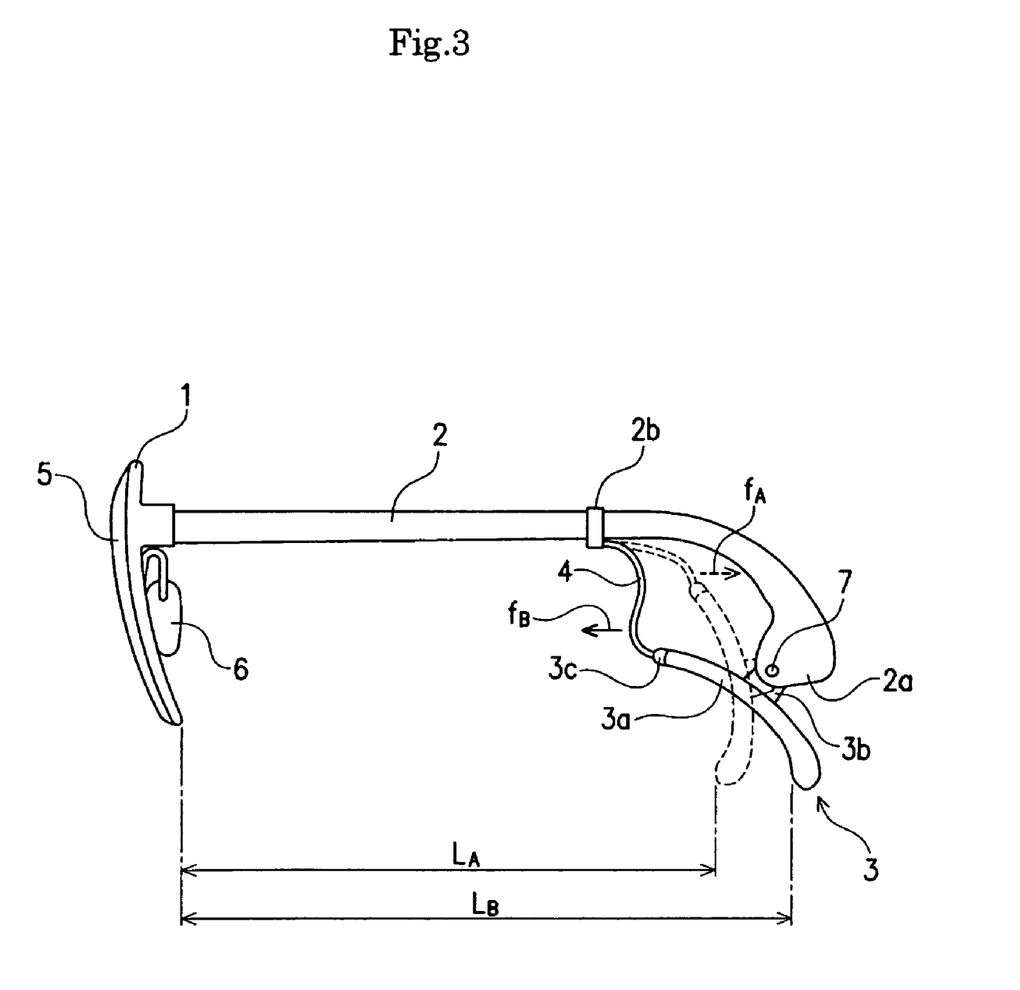
FIG. 3 is a side view of the optical frame for describing oscillation of an ear pad member.

The mode of slippage prevention of the glasses in the optical frame of this embodiment will now be described. FIG. 3 is a side view of the optical frame for describing oscillation of the ear pad member. In the optical frame of this embodiment, when the front frame 1 starts to slip down in a state where the glasses are worn (state A of FIG. 2, and a state shown with a broken line of the ear pad member 3 of FIG. 3), the rear portion of the temple 2 extending from the front frame 1 starts to slip upward, thereby moving the ear contacting portion 3a of the ear pad member 3 attached to the rear portion of the temple 2 upward. Further, when the ear contacting portion 3a of the ear pad member 3 starts to move upward, the ear contacting portion 3a starts to rotate in a front-rotation direction (in a left rotation direction in FIG. 3) with the use of the shaft member 7 passed through the oscillating portion 3b of the ear pad member 3, i.e., a part where the temple 2 is attached, (part 2a of the temple 2, where the ear pad member 3 is attached) as a rotational center (the ear contacting portion 3a of FIG. 3 starts to move to a state shown with a solid line).

Herein, the force of the front end 3c of the ear contacting portion 3a pressing against the back of the ear becomes greater and, as a result, the relative movement between the ear contacting portion 3a and the back of the ear is hindered (the ear contacting portion 3a of FIG. 3 starts to return to a state shown with a broken line) and the slipping up of the rear portion of the temple 2 is prevented. The glasses can be thereby prevented from slipping down.

The present embodiment is configured so that the oscillating portion 3b is provided at an almost intermediate portion of the ear contacting portion 3a in a longitudinal direction thereof.

Figure 4:
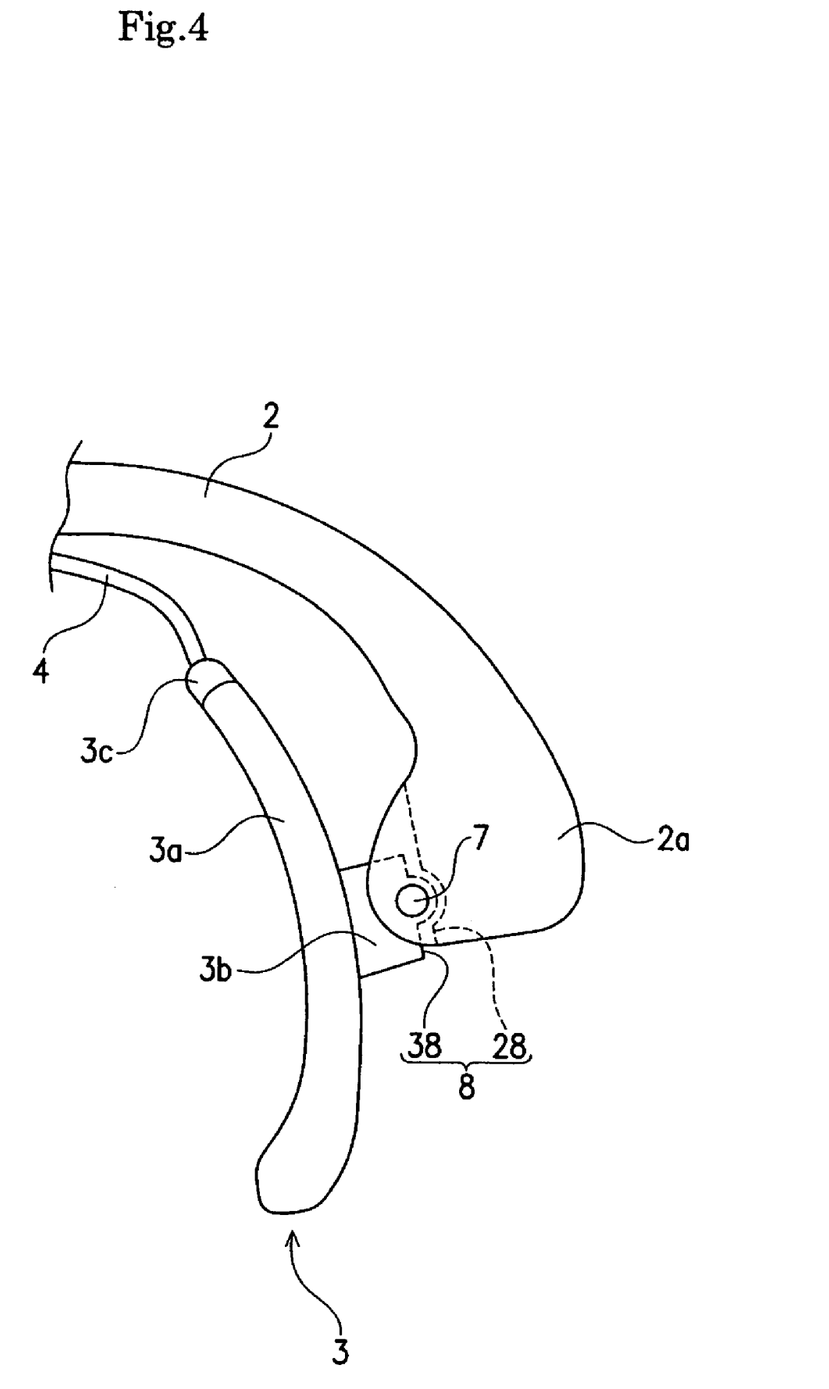
FIG. 4 is an enlarged view in the vicinity of an attaching portion of a temple and the ear pad member in the optical frame of FIG. 1.

A regulating mechanism 8 for regulating the oscillating range of the oscillating portion 3b is provided at the oscillating portion 3b of the ear pad member 3, i.e., a part to which the temple 2 is attached, and at the part 2a of the temple 2, where the ear pad member 3 is attached. In addition, the shaft member 7 such as a pin or a screw is used to attach the temple 2 and the oscillating portion 3b of the ear pad member 3. FIG. 4 is an enlarged view in the vicinity of the attaching portion of the temple and the ear pad member in the optical frame of FIG. 1.

In this embodiment, the regulating mechanism 8 regulates the oscillation by contacting a supporting strip 38 of the oscillating portion 3b of the ear pad member 3 to a contacting surface 38 provided at the part 2a of the temple 2, where the ear pad member is attached, as shown in FIG. 4.

The oscillating range of the ear pad member 3 is regulated by providing the regulating mechanism 8, so that when a user wears the glasses, the ear contacting portion 3a of the ear pad member 3 can easily contact an appropriate portion of the back of the ear and the user can easily wear the glasses.

Since the ear pad member 3 is attached to the attaching portion 2a of the temple 2 by way of the shaft member 7, the loss of force is small, and smooth oscillation can be achieved easily and inexpensively. The regulating mechanism 8 can be easily configured by providing the regulating mechanism 8 about the shaft of the shaft member 7. It is to be noted that although the oscillating portion 3b attached to the ear pad member 3 is attached to the shaft member 7 in a freely oscillating manner in this embodiment, a hole may be opened in the ear pad member 3 itself (ear contacting portion 3a) to allow the ear contacting member 3 to be attached to the temple 2 by way of the shaft member 7 in a freely oscillating manner.

In this embodiment, the part 2a of the temple 2, where the ear pad member 3 is attached, is configured so as to serve as the rear end of the temple 2.

In this case, even when the temple 2 and the ear pad member 3 of the optical frame have a configuration that is not integral with each other, the optical frame can be made similar to the shape of the conventional optical frame, and even the users using the optical frame of a conventionally typical shape can wear the optical frame without feeling uncomfortable.

A mode of tangle prevention of the hair to the glasses in the optical frame of this embodiment will now be described with reference to FIG. 2. As shown in FIG. 2, the flexible tangle preventing member 4 is attached so as to couple the predetermined portion 2b anterior to the part 2a of the temple 2, where the ear pad member 3 is attached, and the front end 3c of the ear contacting portion 3a of the ear pad member 3. Even when the temple 2 is lifted upward (state B of FIG. 2) upon taking off the glasses, the space between the temple 2 and the front end 3c of the ear contacting portion 3a is blocked by the tangle preventing member 4, so that the hair is less likely to enter the attaching portion (oscillating portion 3b) of the temple 2 and the ear contacting portion 3a from the x direction and the tangling thereto is suppressed. Further, since the tangle preventing member 4 has flexibility, the function of suppressing slipping down of the glasses will not be inhibited.

As described above, by coupling the predetermined portion 2b anterior to the part 2a of the temple 2, where the ear pad member 3 is attached, and the front end 3c of the ear contacting portion 3a with the flexible tangle preventing member 4, the glasses are prevented from slipping down without increasing the load on the nose, and the tangling of the hair to the glasses are suppressed upon taking off the glasses.

In this embodiment, as shown in FIGS. 2 and 3, the tangle preventing member 4 is an elastic member such as an elastomer and is configured so as to switch between a posture for acting an elastic force $f_A$ to press the front end 3c of the ear contacting portion 3a to the temple 2 side (state A), and a posture for acting an elastic force $f_B$ to move the front end 3c of the ear contacting portion 3a away from the temple 2 (state B).

The tangle preventing member 4 is made by an elastic member such as an elastomer, and assuming a predetermined position as a switch point, on the side in which the front end 3c of the ear contacting portion 3a is closer to the temple than the switch point, the elastic force $f_A$ shown in FIG. 3 is acted and the front end 3c of the ear contacting portion 3a is held at a position pressed against the temple 2 side as in the state A. On the other hand, when the front end 3c of the ear contacting portion 3a is at a position apart from the temple 2 rather than the switch point, the tangle preventing member 4 bends, causing the direction the elastic force acts to reverse, and thus the elastic force $f_B$ shown in FIG. 3 is acted and the front end 3c of the ear contacting portion 3a is held at a position apart from the temple 2 as in the state B.

Therefore, in the state B where the front end 3c of the ear contacting portion 3a is held at a position apart from the temple 2, a distance $L_B$ between the lens 5 (front frame 1) and the rear end of the tangle preventing member 4 is wider than a distance $L_A$ in the state B. Thus, the user, upon putting on the glasses, can easily wear the glasses without the ear pad member being in the way (without having to hold the ear pad member 3 with hand). Further, by contacting to the ear (by pushing the rear end of the ear contacting portion 3a with the back of the ear), the posture of the tangle preventing member 4 is switched to the posture (state A) for acting the elastic force $f_A$ to press the front end 3c of the ear contacting portion 3a to the temple 2 side and the rear end of the ear contacting portion 3a securely contacts the back of the ear.

In this way, since the tangle preventing member 4 can switch the postures of the ear contacting portion 3a by means the elastic force thereof, the glasses can be more easily worn and, also, the slipping down of the glasses can be more effectively suppressed.

The tangle preventing member 4 can suitably switch the direction of the elastic force by suitably selecting the combination of an elastic coefficient, thickness and length of the elastic member used for the tangle preventing member 4.

For the tangle preventing member 4, various elastic members such as an elastomer (polymer substance having elasticity, such as natural rubber and synthetic rubber), and a leaf spring formed by a shape memory alloy and the like can be adopted as long as the member has elastic force. The tangle preventing member 4 preferably has a cross sectional shape that is long in an axial direction of the shaft member 7 such that the direction of the elastic force is almost parallel with the freely oscillating direction of the ear pad member 3 (so as not to shift in the axial direction of the shaft member 7). Various shapes such as ellipse, semicircle, rectangle and the like may be applied for the relevant cross sectional shape. It may be hollow or solid and may be formed by weaving into a fiber form.

In this embodiment, the elastic member is used for the tangle preventing member 4, but for the material to achieve tangle prevention (when switch of elastic force is not required), any kind of material (may of course be elastic member) may be used as long as the material has flexibility, such as nylon resin. When made of nylon resin and the like, the tangle preventing member 4 can be configured strong and soft at low cost. Further, it may be formed as one unit (may be solid or hollow) or may be formed by weaving into a fiber form. When switch of the elastic force is not required, the predetermined portion 2b of the temple 2, where the tangle preventing member 4 is attached, may be fixed to a predetermined part of the temple 2, or may be attached so as to be slidable along the temple 2.

Figure 5:
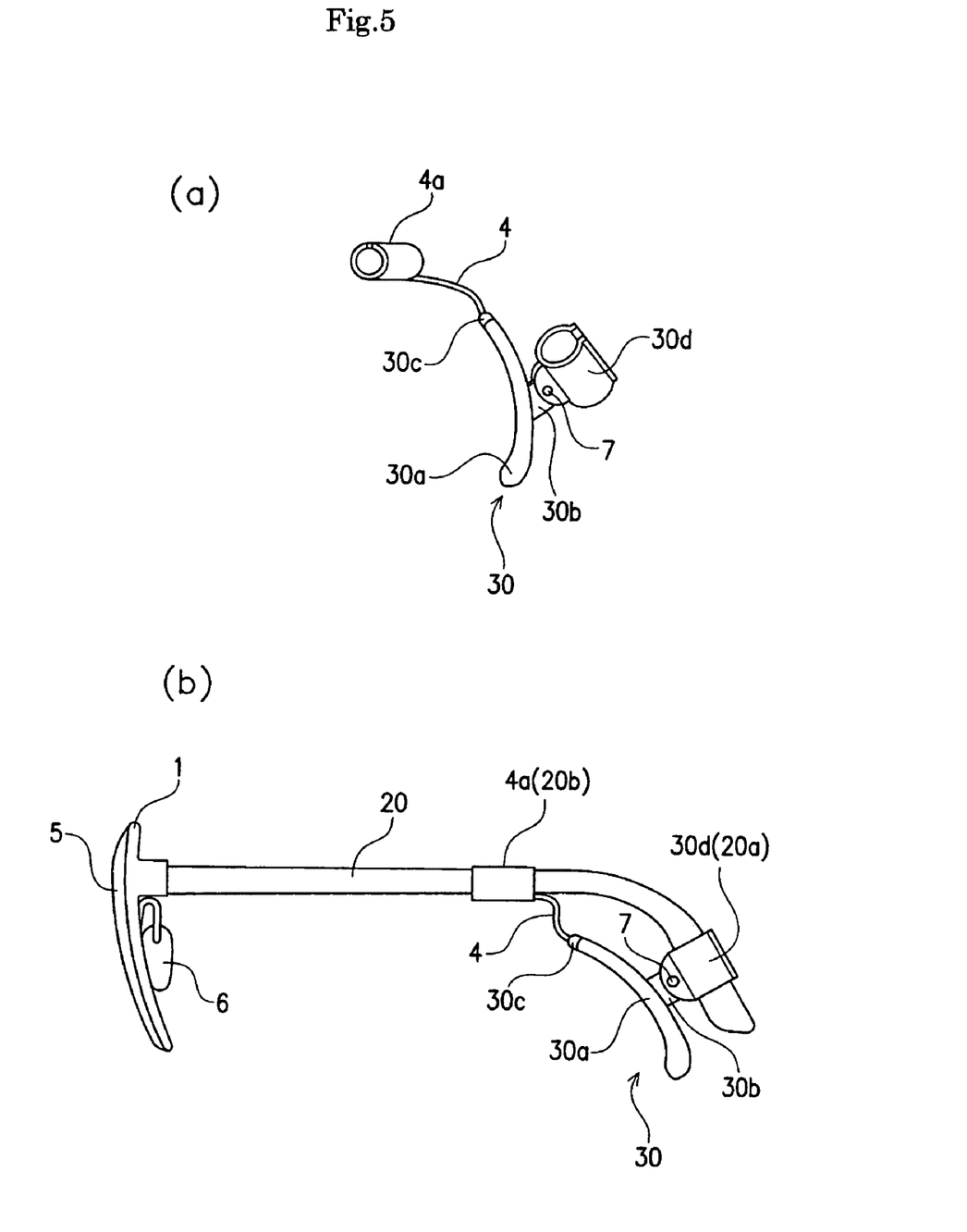
FIG. 5 is a side view of an optical frame attachment according to a second embodiment of the present invention and an optical frame attached therewith.

A second embodiment of the present invention will now be described. FIG. 5 is a side view of an optical frame attachment according to the second embodiment of the present invention and an optical frame attached therewith. FIG. 5(a) shows the optical frame attachment, and FIG. 5(b) shows a case where the optical frame attachment is attached to a typical optical frame.

As shown in FIG. 5, an optical frame attachment 30 according to the present invention is an optical frame attachment 30 removably attached to the optical frame including a front frame 1 for holding the lenses and a pair of temples 20 each extending backward from both ends of the front frame 1 as shown in FIG. 5, and the optical frame attachment 30 comprises a clip portion 30d removably attached to a rear end 20a of the temple 20, an ear contacting portion 30a contactable to a back of an ear, and an oscillating portion 30b to which the shaft member 7 such as a pin or a screw is attached for attaching the clip portion 30d and the ear contacting portion 30a in a freely oscillating manner.

The optical frame attachment 30 of this embodiment is removably attached to the rear end 20a of the temple of a typical optical frame with the clip portion 30d. The clip portion 30d and the ear contacting portion 30a are attached in a freely oscillating manner using the shaft member 7 such as a pin or a screw by the oscillating portion 30b. The temple 20 of the optical frame and the ear contacting portion 30a of the optical frame attachment 30 are thereby attached in a freely oscillating manner.

The clip portion 30d in the optical frame attachment 30 of this embodiment is made of a flexible member such as rubber or resin, and is formed, as shown in FIG. 5(a), into an almost tubular body, i.e., formed into an almost tubular body in which the cross section has an almost similar shape as that of the temple 20, and the inner diameter thereof is set to be slightly smaller than the outer diameter of the temple 20 fitted thereto. An opening with a width narrower than the diameter of the tubular body is formed along the longitudinal direction of the tubular body in the clip portion 30d, and the temple 20 is fitted by being inserted through the opening of the tubular body.

When attaching to most of the typical optical frame having a shape in which the temple 20 gradually thickens toward the rear side, even if a predetermined space is given at the inner diameter of the clip portion 30d, the clip portion 30d can be prevented from slipping off from the rear end of the temple 20. The shape, the material and the like of the clip portion 30d is not limited to those mentioned above and shown in the accompanying drawings, and may be modified within a scope not departing from the purpose of the present invention.

A mode of slippage prevention of the optical frame (FIG. 5(b)) attached with the optical frame attachment 30 of this embodiment is similar to the optical frame of the first embodiment; therefore, the description thereof will not be given herein.

In this way, by providing the clip portion 30d removably attached to the temple 20 of the typical optical frame and by providing the ear contacting portion 30a that freely oscillates with respect to the temple 20 with the clip portion 30d attached to the temple 20, the glasses can be prevented from slipping down without using a special optical frame and without increasing the load on the nose with respect to the optical frame. Even in the case where the user has a plurality of optical frames, by removably attaching the optical frame attachment 30 to the optical frame of various designs, an effective effect of preventing the glasses from slipping down in any kind of optical frame can be achieved with only one (a pair of) optical frame attachment.

Various modifications of, for example, the position where the oscillating portion 30b is attached to the ear contacting portion 30a, the regulating mechanism of the oscillating portion 30b and the like are also applicable, similar to the first embodiment.

In this embodiment, as shown in FIG. 5, a flexible tangle preventing member 4 is further provided, which has a first end coupled to the front end 30c of the ear contacting portion 30a and a second end removably attached to a predetermined portion 20b positioned anterior to a part 20a of the temple 20 where the clip portion 30b of the temple 20 is attached.

In this case, the flexible tangle preventing member 4 is attached so as to couple the predetermined portion 20b anterior to the part 20a, where the clip portion 30d is attached, of the temple 20 of the optical frame and the front end 30c of the ear contacting portion 30a of the optical frame attachment 30. Even when the temple 20 is lifted upward upon taking off the glasses, since the space between the temple 20 and the front end 30c of the ear contacting portion 30a is blocked by the tangle preventing member 4, the hair is less likely to enter the attaching portion (oscillating portion 30b) of the temple 20 and the ear contacting portion 30a, and tangling thereto is suppressed. The tangle preventing member 4 has flexibility and does not inhibit the oscillation of the ear contacting portion 30a of the optical frame attachment 20, and thus does not inhibit the function of suppressing the slipping down of the glasses.

In this manner, by coupling the predetermined portion 20b anterior to the part 20a, where the clip portion 30d is attached, of the temple 20 of the optical frame and the front end 30c of the ear contacting portion 30a of the optical frame attachment 30 with the flexible tangle preventing member 4, the glasses can be prevented from slipping down without increasing the load on the nose, and the tangling of the hair to the glasses can be suppressed upon taking off the glasses.

The tangle preventing member 4 according to this embodiment is also configured so as to be made of elastomer, nylon resin or the like. In this case, when made of elastomer, nylon resin or the like, the tangle preventing member 4 is configured strong and soft at low cost. The tangle preventing member 4 may be made of any material as long as the material has flexibility, and may be formed as one unit (may be solid or hollow) or may be formed by weaving into a fiber form.

In a configuration for removably attaching the second end of the tangle preventing member 4 according to this embodiment to the temple 20, as shown in FIG. 5(a), a clip portion 4a made of a flexible member such as elastomer or resin similar to the clip portion 30d is used.

In this embodiment as well, similar to the first embodiment, the predetermined portion 20b of the temple 20, where the clip portion 4a of the tangle preventing member 4 is attached, may be fixed to a predetermined part of the temple 20 without sliding of the clip portion 4a, or may be slidably attached along the temple 20. When fixed without sliding of the clip portion 4a, similar to the first embodiment, the tangle preventing member 4 is an elastic material such as an elastomer, and thus may be configured so as to switch between a posture for acting the elastic force $f_A$ to press the front end 3c of the ear contacting portion 3a against the temple 2 side (state A) and a posture for acting the elastic force $f_B$ to move the front end 3c of the ear contacting portion 3a away from the temple 2 (state B).

Further, in this embodiment, the clip portion 4a made of a flexible member is used as a mode of attachment to the temple 20 of the tangle preventing member 4, but attachment may also be performed by forming a hole through which the temple 20 passes at an end, to which the temple 20 is attached, of the tangle preventing member 4, and passing the temple 20 through the hole. In this case, the diameter of the hole is set to be slightly smaller than the predetermined portion 20b of the temple 20. If the outer diameter of the rear end of the temple 20 is large and can not pass through the hole, the front frame 1 and the temple 20 are disassembled once and after passing the temple 20 through the hole of the tangle preventing member 4, the front frame 1 and the temple 20 are again assembled.

As described above, according to the optical frame and the optical frame attachment according to the present invention, by coupling the predetermined portion anterior to the attaching portion of the temple and the front end of the ear pad member with the flexible tangle preventing member, the glasses can be prevented from slipping down without increasing the load on the nose, and the tangling of the hair to the glasses can be suppressed upon taking off the glasses.

The invention claimed is:

1. An optical frame attachment removably attached to an optical frame including a front frame for holding lenses, and a pair of temples each extending backward from both ends of said front frame, the optical frame attachment comprising:
    a clip portion removably attached to a rear portion of said temple;
    an ear contacting portion attached to said clip portion in a freely oscillating manner by way of a shaft member and contactable to a back of an ear; and
    a flexible tangle preventing member having a first end coupled to a front end of said ear contacting portion and a second end removably attached to a predetermined portion anterior to a part of said temple, where said clip portion is attached.

2. An optical frame attachment according to claim 1, wherein said tangle preventing member is an elastic member, and is configured to switch between a posture for acting an elastic force to press the front end of said ear contacting portion toward said temple side and a posture for acting an elastic force to move the front end of said ear contacting portion away from said temple.

3. An optical frame attached with the optical frame attachment according to claim 2.

4. An optical frame attached with the optical frame attachment according to claim 1.

5. An optical frame comprising:
a front frame for holding lenses;
a pair of temples each extending backward from both ends of said front frame;
an ear pad member having an ear contacting portion attached with the rear portion of said temple in a freely oscillating manner by way of a shaft member and contactable to a back of an ear; and
a flexible tangle preventing member for coupling a predetermined portion anterior to a part of said temple, where said ear pad member is attached, and a front end of said ear contacting portion, wherein
said tangle preventing member is an elastic member, and is configured to switch between a posture for acting an elastic force to press the front end of said ear contacting portion toward said temple side and a posture for acting an elastic force to move the front end of said ear contacting portion away from said temple.

* * * * *